Dec. 29, 1970  L. T. GRAY  3,550,212
FOAM MOLD APPARATUS AND RECOVERY OF SCRAP MATERIAL
Filed Dec. 5, 1968

INVENTOR.
L. T. GRAY
BY
Young & Quigg
ATTORNEYS 3,550,212
FOAM MOLD APPARATUS AND RECOVERY
OF SCRAP MATERIAL
Lew T. Gray, Bartlesville, Okla., assignor to Phillips
Petroleum Company, a corporation of Delaware
Filed Dec. 5, 1968, Ser. No. 781,377
Int. Cl. B29d 27/04; B29c 5/00
U.S. Cl. 18—39
4 Claims

ABSTRACT OF THE DISCLOSURE

Articles are formed by stamping or compression molding of foamed thermoplastic material. The mold is provided with one or more auxiliary cavities surrounding the main mold cavity to receive excess thermoplastic material. These auxiliary cavities are of such size as to densify the scrap material when the mold is closed. Vent means are provided to permit the escape of gas from the crushed foam.

---

Figure 1:
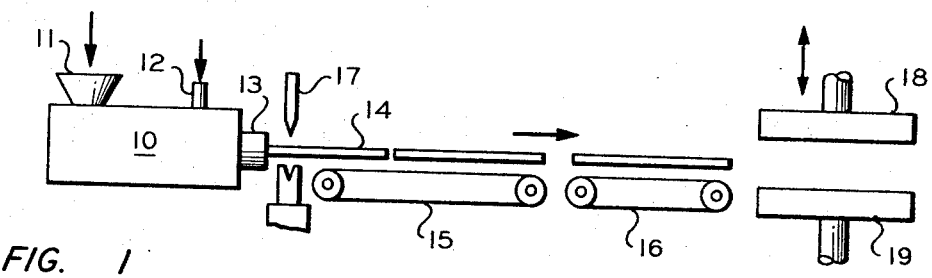

Articles of various configurations can be produced by compression or stamp molding sheets of foamed thermoplastic material. In operations of this type, it is conventional to direct a generally flat sheet of foamed material in the softened state to a mold in which the shaped articles are produced. Unfortunately, operations of this type normally produce substantial quantities of waste material which must be reused if an economic process is to be realized. This poses a rather serious problem in the molding of foamed materials because the scrap is of low density, and as such cannot be returned directly to the extruder without having an adverse effect on the production rate. In order to overcome this difficulty, various types of grinding and chopping procedures have been suggested for increasing the density of the scrap before it is returned to the extruder. However, these procedures require extra equipment and increase the cost of operation.

In accordance with the present invention, the mold is designed so that scrap is compressed and densified at the time the molded object is formed. This is accomplished by incorporating in the mold one or more auxiliary cavities which receive the excess material. These cavities are of such size that a substantial compressive force is applied when the mold is closed, thereby rupturing the cells of the foamed material and greatly increasing its density. The mold can be provided with puncturing means which extend into the auxiliary cavities to rupture the cell structure of the plastic material. Vent passages can also be provided to permit gas to escape from the ruptured cells. In this manner, the excess material is densified in the molding operation and can be reused without further treatment.

Another object is to provide apparatus for use in the molding of foamed materials.

Figure 2:
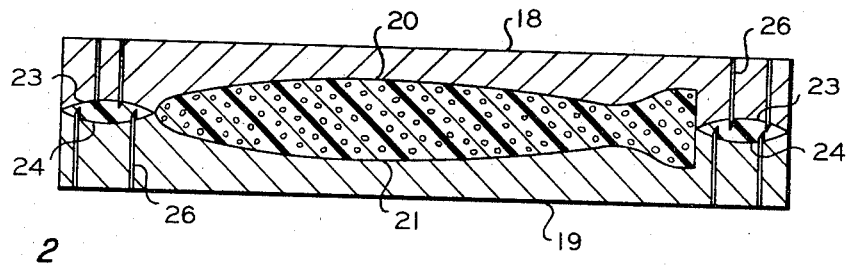
Figure 3:
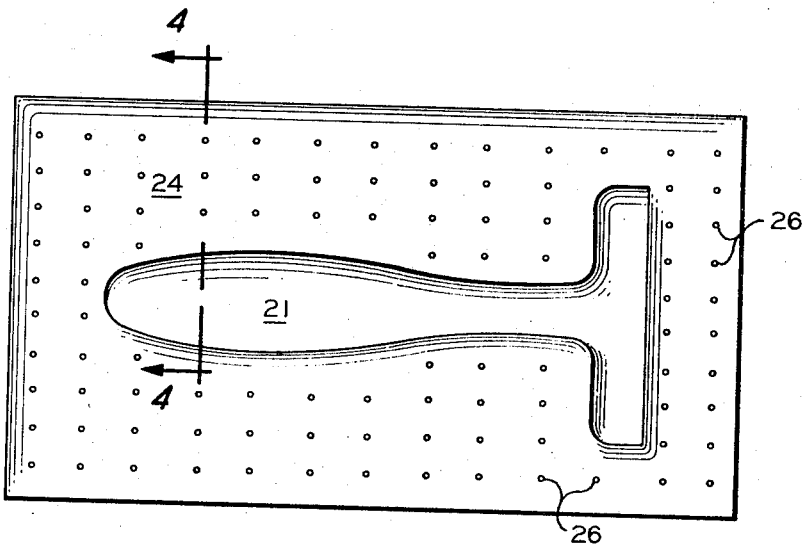
Figure 4:
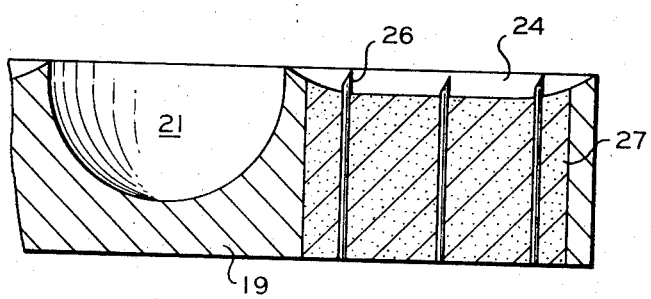

In the drawing:

FIG. 1 is a schematic representation of apparatus employed to extrude foamed plastic sheets and to mold atricles therefrom. FIG. 2 is a cross-sectional view of an embodiment of the mold employed in the apparatus of FIG. 1. FIG. 3 is a top view of the bottom section of the mold of FIG. 1. FIG. 4 is a sectional view taken along line 4—4 in FIG. 3.

Referring now to the drawing in detail and to FIG. 1 in particular, there is shown an extruder 10 which is adapted to provide a foamed sheet of thermoplastic material. The thermoplastic material to be foamed is introduced into a hopper 11, and a foaming agent is introduced through a conduit 12. The nozzle 13 of the extruder is of such configuration that a flat sheet of foamed material 14 is emitted. Extruder 10 can advantageously be of the type disclosed in U.S. Pat. 3,342,913, although other types of foaming apparatus can be employed to produce sheet 14. The foamed sheet is removed by a conveyor 15. A cutting means 17 is employed to sever the extrudate into sheets of desired lengths. The severed sheets are transmitted by a second conveyor 16 to a molding station wherein the sheet is stamped between mold halves 18 and 19 to produce desired shaped articles.

As illustrated in FIGS. 2 to 4, the two mold halves are provided with aligned cavities 20 and 21 of a configuration corresponding to the shape of the article to be molded. In the illustrated embodiment of this invention, the resulting mold cavity is of such shape as to form a paint brush handle. While only a single mold cavity is shown for the purpose of simplifying the drawing, mold halves 18 and 19 can actually contain a plurality of such cavities so that a substantial number of articles can be produced simultaneously. The individual cavities in the mold can be staggered to minimize the amount of scrap material produced. For some applications, the mold can be constructed of more than two sections.

As illustrated in FIG. 2, mold halves 18 and 19 are also provided with additional cavities 23 and 24 immediately adjacent the main cavity which produces the desired article. These auxiliary cavities have substantially less depth than the main cavity so that the excess foamed material is greatly compressed when the two mold halves are closed. The resulting compression force serves to rupture the cells of the foamed material and thereby increases the density of the scrap material. This cell rupturing can be facilitated by providing one or more hollow needles 26 which extend into the auxiliary cavities. These needles serve to puncture the cells of the foamed material and to provide passage through which gas can escape. A large number of needles can be employed in the molds for this purpose. In addition to needles 26, the mold can be provided with inserts 27 of porous metal to permit gas to escape when the scrap material is crushed, as illustrated in FIG. 4. In this embodiment, the puncturing means can be hollow needles or solid projectiles. As an alternative, inserts 27, whether porous or not, can be movable with respect to the mold halves and can be moved inwardly by an external force independent of the mold closing to provide the desired compression of the scrap. When the mold halves are opened following the stamping or compression molding operation, the densified scrap material can be removed and recycled to feed hopper 11 of extruder 10.

In molding operations in accordance with this invention, it is desirable that the foamed sheets 14 be in a somewhat softened state when they are inserted between the mold halves in order that a final shaping takes place. This can be accomplished by the use of a temperature controlled housing between extruder 10 and the mold. The depth of cavities 23 and 24 is determined in part by the degree of foaming imparted to the foamed sheet. When a substantial amount of foaming agent is introduced to produce a sheet having a low density, secondary cavities 23 and 24 can be relatively shallow to provide a substantial compression of the scrap. If less foaming agent is introduced into the extruder, cavities 23 and 24 should have greater depth. In any event, these secondary cavities must be sufficiently deep to permit the mold halves to close completely to form the molded object. In order to facilitate the escape of gas from cavities 23 and 24, needles 26 and/or insert 27 can be connected to a vacuum source. If the material being molded tends to block the ends of needles, an external pressure source can be connected to the needles when the mold is open to remove any deposits.

While this invention has been described in conjunction with presently preferred embodiments, it obviously is not limited thereto.

What is claimed is:

1. Molding apparatus comprising a mold formed of at least two sections, said mold being provided with a first cavity of such configuration as to form a shaped object when the mold sections are closed about a material to be formed, said mold also being provided with at least one second cavity outside said first cavity to receive excess material, said second cavity being entirely enclosed within the sections when the sections are closed, the depth of said second cavity being such that excess material positioned therein is compressed substantially more than is the material positioned within said first cavity when the mold sections are closed, and at least one of said mold sections being provided with at least one gas passage extending from the second cavity to a region exterior of the mold to vent gas, said gas passage being sufficiently small to prevent material being molded from passing therethrough.

2. The apparatus of claim 1 wherin said gas passage comprises a plurality of needles extending through said mold section.

3. The apparatus of claim 1 wherein said gas passage is formed by a section of the mold being formed of gas permeable material.

4. Molding apparatus comprising a mold formed of at least two sections, said mold being provided with a first cavity of such configurations as to form a shaped object when the mold sections are closed about a material to be formed, said mold also being provided with at least one second cavity outside said first cavity to receive excess material, the depth of said second cavity being such that excess material positioned therein is compressed substantially more than is the material positioned within said first cavity when the mold sections are closed, and comprising foam puncturing means extending into said second cavity.

References Cited

UNITED STATES PATENTS

| | | | |
|---|---|---|---|
| 1,592,536 | 7/1926 | O'Neill | 18—Vent Dig. |
| 2,619,702 | 12/1952 | Blackburn et al. | 249—141X |
| 2,733,494 | 2/1956 | Bryer et al. | 18—42MX |
| 2,955,323 | 10/1960 | Rivenes | 18—42M |
| 3,056,168 | 10/1962 | Terry | 18—39UX |
| 3,078,508 | 2/1963 | Martin | 18—Vent Dig. |
| 3,244,783 | 4/1966 | Eissfeldt et al. | 18—5PX |
| 3,248,758 | 5/1966 | Schmitz et al. | 18—39X |
| 3,432,581 | 3/1969 | Rosen | 18—26X |
| 3,456,046 | 7/1969 | Rosen | 18—26UX |

FOREIGN PATENTS

| | | | |
|---|---|---|---|
| 218,991 | 1/1958 | Australia | 249—141 |
| 1,055,226 | 4/1959 | Germany | 18—Vent Dig. |
| 1,198,044 | 8/1965 | Germany | 18—39 |

J. HOWARD FLINT, JR., Primary Examiner

U.S. Cl. X.R.

18—Vent Dig.; 249—141